United States Patent
Xu (10) Patent No.: US 8,015,132 B2
(45) Date of Patent: Sep. 6, 2011

(54) SYSTEM AND METHOD FOR OBJECT DETECTION AND CLASSIFICATION WITH MULTIPLE THRESHOLD ADAPTIVE BOOSTING

(75) Inventor: Ning Xu, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 770 days.

(21) Appl. No.: 12/122,393

(22) Filed: May 16, 2008

(65) Prior Publication Data
US 2009/0287620 A1    Nov. 19, 2009

(51) Int. Cl.
*G06F 15/18* (2006.01)
(52) U.S. Cl. ........... 706/20; 382/159; 382/170; 382/190
(58) Field of Classification Search .................... 706/20; 382/159, 170, 190
See application file for complete search history.

(56) References Cited

U.S. PATENT DOCUMENTS

| 7,421,114 B1 * | 9/2008 | Brandt | 382/159 |
| 7,639,869 B1 * | 12/2009 | Brandt | 382/159 |
| 7,724,960 B1 * | 5/2010 | Mikhael et al. | 382/190 |

OTHER PUBLICATIONS

Chang Huang; Haizhou Ai; Bo Wu; Shihong Lao; "Boosting nested cascade detector for multi-view face detection," Pattern Recognition, 2004. ICPR 2004. Proceedings of the 17th International Conference on, vol. 2, No., pp. 415-418 vol. 2, Aug. 23-36, 2004 doi: 10.1109/ICPR.2004.1334239 URL: http://ieeexplore.ieee.org/stamp/stamp.jsp?tp=&arnumber=1334.*
Rong Xiao; Ming-Jing Li; Hong-Jiang Zhang; "Robust multipose face detection in images," Circuits and Systems for Video Technology, IEEE Transactions on, vol. 14, No. 1, pp. 31-41, Jan. 2004 doi: 10.1109/TCSVT.2003.818351 URL: http://ieeexplore.ieee.org/stamp/stamp.jsp?tp=&arnumber=1262029&isnumber=28212.*
Bilmes, J., A Gentle Tutorial of the Algorithm and its Application to Parameter Estimation for Gaussian Mixture and Hidden Markov Models, Technical Report, University of Berkeley, 1998.
Duda, Richard O., Hart, Peter E., Stork, David G., Chapters 2 and 3, Pattern Classification, Oct. 2000, vol. Second Edition, pp. 20-83 and 84-160.
Viola and Jones, Robust Real-time Object Detection, International Journal of Computer Vision 57(2), 137-154, 2004.

* cited by examiner

*Primary Examiner* — David R Vincent
*Assistant Examiner* — Ola Olude-Afolabi (57) ABSTRACT

Systems and methods that comprise receiving a training set of samples, a set of features for a first subset of the set of features, a feature value with a first subset of the training set, a weight with a second subset of the training set. Determining for a second subset of the set of features, a first threshold value with a first metric minimized, and determining, for a third subset of the set of features, a second threshold value with a second metric is minimized, then determining, for a fourth subset of the set of features, a number of thresholds, determining, for a fifth subset of the set of features, an error value based on the number of thresholds, afterward determining the feature having the lowest error, and finally updating the weights by classifying a sample as either belonging to an object class or not based on the strong classifier.

19 Claims, 7 Drawing Sheets

SYSTEM AND METHOD FOR OBJECT DETECTION AND CLASSIFICATION WITH MULTIPLE THRESHOLD ADAPTIVE BOOSTING

BACKGROUND

1. Field

The disclosure relates to object classification and detection, and in particular to the use of an adaptive boosting detection method.

2. Description of the Related Art

Recent developments in digital imagery, digital video and the increase in capacity of data storage have produced many types of automatic object recognition and object identification systems and methods. Improvements in the precision of digital cameras and other image capture systems have provided unprecedented amounts of data to be analyzed and used by various analysis methods. Improvements in processing speeds have allowed for increased performance and more detailed data analysis, but efficient analysis is still important in order to reduce required time and improve power savings.

One form of detailed data analysis that the improvements in processing speeds has allowed is object classification and detection. Although, the human brain is naturally wired to perform this function automatically, it is a computationally intensive task for a computer. Object classification is the act of classifying a data sample into one or more object classes. Thus, a classifier receives a data sample and provides additional information about that sample, particularly, whether or not the sample is representative of a particular object. The data sample may comprise a data measurement such as temperature, pressure, or attendance at a sports stadium. The data sample may also be a data vector combining a number of data measurements. The data sample may also be a sound clip, a digital image, or other representation of perceptual media. For example, a data sample comprising a sound clip of music may classify the sample as belonging to a "Classical" object class, a "Rock/Pop" object class, or an "Other" object class. Classifying the sample as a "Classical" object indicates that the sound clip is representative of other "Classical" objects, which would be, e.g., other sound clips of classical music. One could thus infer that the data sample is a sound clip of classical music, or at least shares a number of characteristics of classical music, based on the computer-generated classification into the "Classical" object class.

One type of computer-implemented module that finds use in this classification process is a binary classifier. A binary classifier receives, as an input, a data sample and outputs an indication of whether the sample belongs to an object class or does not belong to an object class. Other classifiers receive a data sample and output an indication of which object class, if any, the sample belongs to. For example, if a set of images is provided which contain various commonly recognized objects (such as a balls, vehicles, umbrellas, cows, people, etc.), these images can be analyzed by an appropriately programmed computer to develop a classifier for automatic classification of objects contained in new images to be analyzed. Simple classifiers that have been created based on a single image feature of an object tend to have poor categorization performance, and thus fall into the category of "weak classifiers." Such performance can be improved by the use of "boosting" methods, which combine a number of weak classifiers to form a "strong classifier," which classifies objects more accurately.

While boosting is not algorithmically constrained, most boosting algorithms follow a template. Typically boosting occurs in iterations, by incrementally adding weak classifiers to form a final strong classifier. At each iteration, a weak classifier learns the training data with respect to a distribution. The weak classifier is then added to the final strong classifier. This is typically done by weighting the weak classifier in some manner, which is typically related to the weak classifier's accuracy. After the weak classifier is added to the final strong classifier, the data is reweighted: examples that are misclassified gain weight and examples that are classified correctly lose weight. Thus, future weak classifiers will focus more on the examples that previous weak learners misclassified.

One such boosting method is an adaptive boosting detection method which is the method most used to train a cascade of strong classifiers using a training set of object images so that the strong classifier is effective in detecting the object in new images. Traditional use of the adaptive boosting method requires intensive computation and thus, a large amount of time, to train the system and use it for object detection. Improvements to the detection speed may enable real-time applications.

SUMMARY OF CERTAIN INVENTIVE ASPECTS

One aspect of the development is a method of defining a strong classifier, the method comprising receiving a training set of positive and negative samples, receiving a set of features, associating, for each of a first subset of the set of features, a corresponding feature value with each of a first subset of the training set, associating a corresponding weight with each of a second subset of the training set, iteratively i) determining, for each of a second subset of the set of features, a first threshold value at which a first metric is minimized, ii) determining, for each of a third subset of the set of features, a second threshold value at which a second metric is minimized, iii) determining, for each of a forth subset of the set of features, a number of thresholds, iv) determining, for each of a fifth subset of the set of features, an error value based on the determined number of thresholds, v) determining the feature having the lowest associated error value, and vi) updating the weights, defining a strong classifier based on the features having the lowest error value at a plurality of iterations, and classifying a sample as either belonging to an object class or not belonging to an object class based on the strong classifier.

Another aspect of the development is a system for defining a strong classifier, the system comprising an input configured to receive a training set of positive and negative samples, a feature module configured to receive a set of features, a feature value module configured to associate, for each of a first subset of the set of features, a corresponding feature value with each of a first subset of the training set, a weight module configured to associate a corresponding weight with each of a second subset of the training set, a computation module configured to iteratively i) determine, for each of a second subset of the set of features, a first threshold value at which a first metric is minimized, ii) determine, for each of a third subset of the set of features, a second threshold value at which a second metric is minimized, iii) determine, for each of a forth subset of the set of features, a number of thresholds, iv) determine, for each of a fifth subset of the set of features, an error value based on the determined number of thresholds, v) determine the feature having the lowest associated error value, and vi) update the weights, a definition module configured to define a strong classifier based on the features having the lowest error value at a plurality of iterations, and a classification module configured to classify a sample as either belonging to an object class or not belonging to an object class based on the strong classifier.

Another aspect of the development is a system for defining a strong classifier, the system comprising means for receiving a training set of positive and negative samples, means for receiving a set of features, means for associating, for each of a first subset of the set of features, a corresponding feature value with each of a first subset of the training set, means for associating a corresponding weight with each of a second subset of the training set, means for iteratively i) determining, for each of a second subset of the set of features, a first threshold value at which a first metric is minimized, ii) determining, for each of a third subset of the set of features, a second threshold value at which a second metric is minimized, iii) determining, for each of a forth subset of the set of features, a number of thresholds, iv) determining, for each of a fifth subset of the set of features, an error value based on the determined number of thresholds, v) determining the feature having the lowest associated error value, and vi) updating the weights, means for defining a strong classifier based on the features having the lowest error value at a plurality of iterations, and means for classifying a sample as either belonging to an object class or not belonging to an object class based on the strong classifier.

Still another aspect of the development is a program storage device storing instructions that when executed perform a method of defining a strong classifier, the method comprising receiving a training set of positive and negative samples, receiving a set of features, associating, for each of a first subset of the set of features, a corresponding feature value with each of a first subset of the training set, associating a corresponding weight with each of a second subset of the training set, iteratively i) determining, for each of a second subset of the set of features, a first threshold value at which a first metric is minimized, ii) determining, for each of a third subset of the set of features, a second threshold value at which a second metric is minimized, iii) determining, for each of a forth subset of the set of features, a number of thresholds, iv) determining, for each of a fifth subset of the set of features, an error value based on the determined number of thresholds, v) determining the feature having the lowest associated error value, and vi) updating the weights, defining a strong classifier based on the features having the lowest error value at a plurality of iterations, and classifying a sample as either belonging to an object class or not belonging to an object class based on the strong classifier.

DETAILED DESCRIPTION OF EMBODIMENTS

The systems and methods of the development each have several aspects, no single one of which is solely responsible for its desirable attributes. Without limiting the scope of this development as expressed by the claims which follow, its more prominent features will now be discussed briefly. After considering this discussion, and particularly after reading the section entitled "Detailed Description of Embodiments" one will understand how the sample features of this development provide advantages that include classification of images into one or more class of objects.

Computer vision is the science and technology of automated image analysis enabling machines to see and analyze image data for various pieces of information. The image data can take many forms, such as single images, a video sequence, views from multiple cameras, or multi-dimensional data such as that received from a medical scanner.

A digital image is produced by one or several image sensors which, besides various types of light-sensitive cameras, include range sensors, tomography devices, radar, ultra-sonic cameras, or other imaging devices. Depending on the type of sensor, the resulting image data is an ordinary 2D image, a 3D volume, or an image sequence. The image data may comprises a plurality of pixels, each associated with a value, where the pixel values typically correspond to light intensity in one or several spectral bands (e.g., gray images or color images), but can also be related to various physical measures, such as depth, absorption or reflectance of sonic or electromagnetic waves, or nuclear magnetic resonance. As used herein, digital image data (or image data) is defined to include any of the forms of visual images or non-visual images known to skilled technologists.

In some aspects, computer vision seeks to apply the theories and models of computer vision to perform various tasks in computer vision systems. Examples of applications of computer vision systems include, for example, process control (e.g. an assembly line robot), visual surveillance for detecting events or presence of people or things, identifying and organizing image information contained in databases, and human-machine interaction.

Object classification is a typical task of computer vision which involves determining whether or not an image contains some specific category of object. The idea is closely related with recognition, identification, and detection. Appearance-based object classification typically contains feature extraction, learning a classifier, and applying the classifier to new examples. There are many ways to represent a class of objects, e.g. from shape analysis, bag-of-words models, or local descriptors such as SIFT (Scale-Invariant Feature Transform). Examples of classifiers are Naive Bayes classifier, SVM (Support Vector Machine), mixtures of Gaussian, and neural network. The objects can also be classified as being "positive" or "negative."

A positive sample is a sample representative of data that the trained system should classify as positive, e.g. belonging to an object class, and a negative sample is a sample representative of data that the systems should classify as negative, e.g. not belonging to an object class. By providing a set of known positive samples and a set of known negative samples to an appropriately configured computerized system, the system "learns" features of the positive samples that are not present in the negative samples. The system may then look for these features in an unknown sample, and when they are present, declare that the sample is a positive sample. The process of providing test samples to the system and allowing or "teaching" the system to learn prominent features is known as training the classifier.

System Overview

Figure 1:
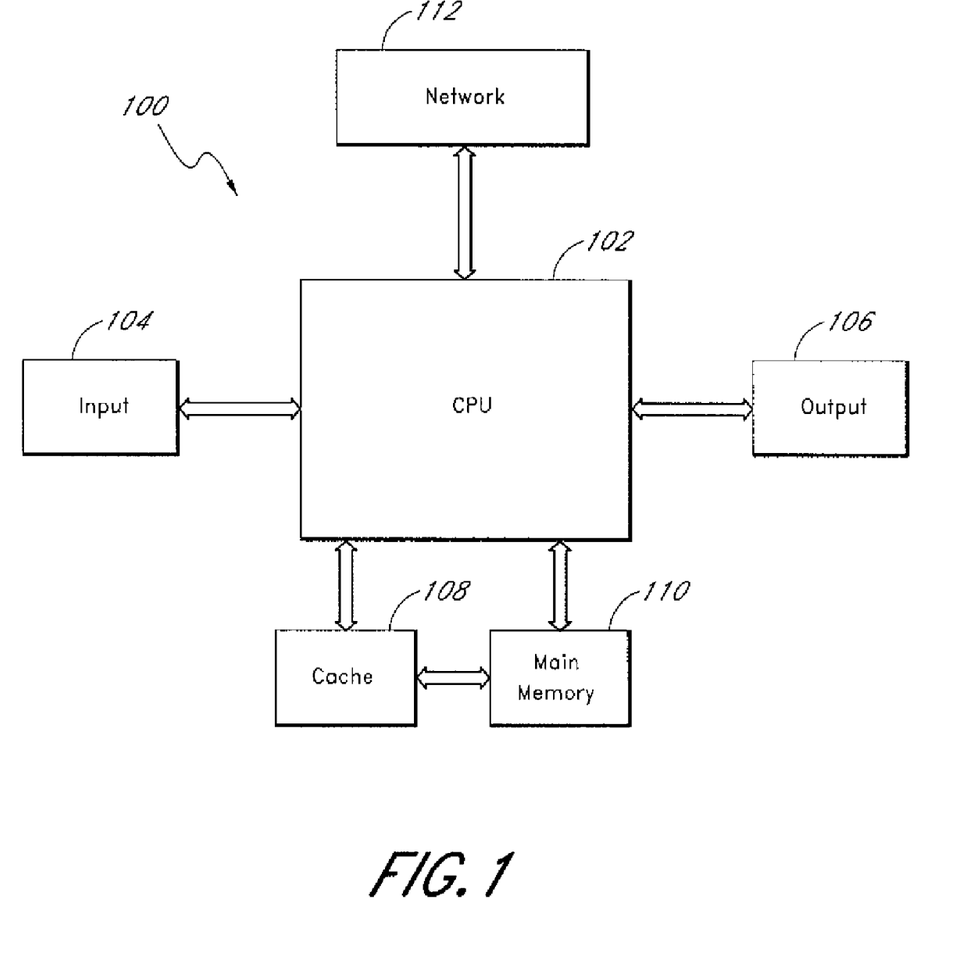
FIG. 1 is a functional block diagram of a system which may be configured to perform the methods disclosed herein.

FIG. 1 is a functional block diagram of a system capable of implementing the methods disclosed herein. The system 100 comprises an input 104, an output 106, a central processing unit 102, a cache 108, a main memory 110, and is connected to a network 112. The system 100 may be embodied in, for example, a personal computer or a dedicated processing unit for video analysis. The input 104 is connected to and configured to provide information to the central processing unit 102 and may embody, for example, a keyboard, a mouse, a video camera, a microphone, or other input device. The input 104 may be configured to receive information from a user, or from any other source outside the system. Similarly, the output 106 is connected to and configured to provide information from the central processing unit 102 and may embody, for example, a monitor, speakers, or an alarm system. The output 106 may be configured to provide information to a user, or to other source outside the system.

The central processing unit 102 may be any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the processing unit 102 may be any conventional special purpose microprocessor such as a digital signal processor. In the embodiment of FIG. 1, the central processing unit 102 is connected to both a cache 108 and a main memory 110.

The cache 108 and the memory 110 may be configured to store, among other things, instruction modules, training sets, feature sets, image data, and video data. Both the cache 108 and main memory 110 are connected to each other and may embody electronic circuitry that allows information, which is typically computer data, to be stored and retrieved. The cache 108 or main memory 110 may also comprise external devices or systems such as, for example, disk drives or tape drives. The cache 108 or main memory 110 may also comprise fast semiconductor storage (chips) such as, for example, Random Access Memory (RAM) or various forms of Read Only Memory (ROM), which are directly connected to the central processing unit 102. Other types of memory that can comprise the cache 108 or the main memory 110 include bubble memory and core memory. In some embodiments, the cache 108 is configured to be accessed faster than the main memory 110. In many cases, however, the cache is more expensive and thus has less storage capacity than the main memory 110.

In general, the word module, as used herein, refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. Generally, the modules described herein refer to logical modules that may be combined with other modules or divided into sub-modules despite their physical organization or storage.

The system 100 is generally controlled and coordinated by server and/or desktop computer operating system software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In other embodiments, the system 100 may be controlled by a proprietary operating system. Conventional operating systems control and schedule computer processes for execution, perform memory management, provide file system, networking, and I/O services, and provide a user interface, such as a graphical user interface ("GUI"), among other things.

In the embodiment of FIG. 1, the system 100 may be in communication with a network 112, such as any combination of one or more LANs, WANs, or the Internet, for example, via a wired connection, wireless connection, or combination of wired and wireless connections. The network may communicate with various computing devices and/or other electronic devices via wired or wireless communication links. For example, a data stream may be received from a network and comprise data, such as web or email data, for example, transmitted from one or more device across the Internet.

Training an object classification or object detection system involves analyzing a set of positive and negative samples, where the positive samples belong to the object class and the negative samples do not belong to the object class. The computer extracts features in either a supervised or unsupervised manner to learn the difference between a positive and negative sample. These features may be applied to new samples to determine whether they should be classified as belonging to the object class or not belonging to the object class.

Figure 2:
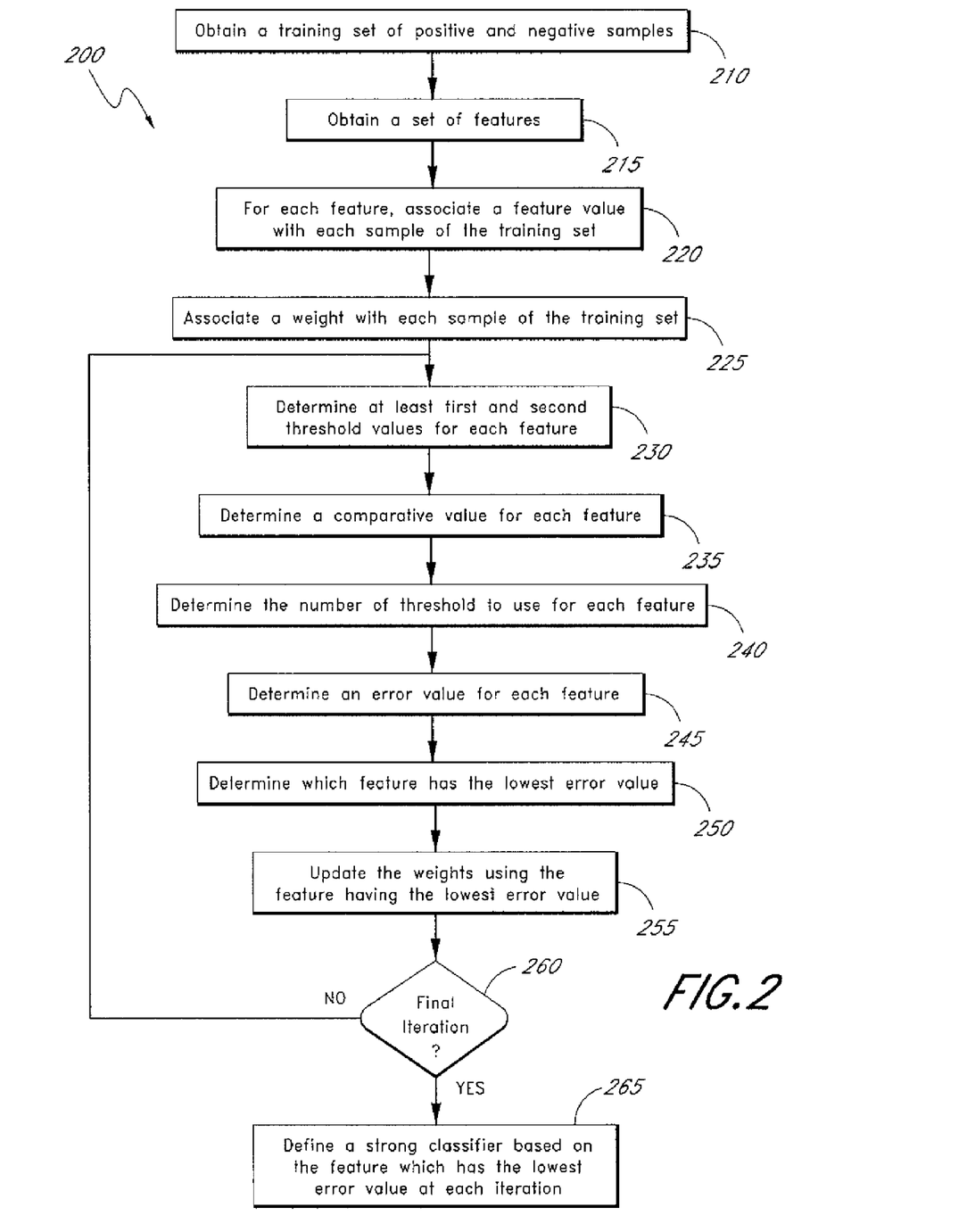
FIG. 2 is a flowchart illustrating a method of training a system for object detection.
Figure 3:
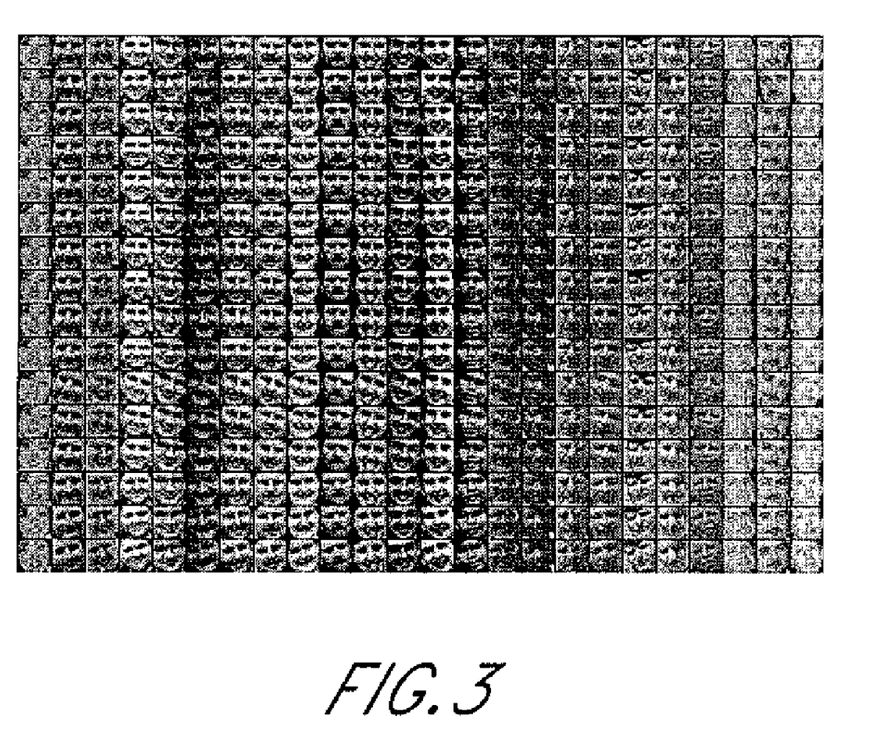
FIG. 3 illustrates an exemplary collection of positive samples for training a face detection system.

FIG. 2 is flowchart illustrating a method of training a system for object detection. The process 200 begins, in block 210, by obtaining a training set of positive and negative samples. As one application of the trained system is to take an input image and classify portions of that image as belong to a particular object class, it is beneficial to train the system with a collection of images belonging to the object class and a collection of images not belonging to the object class. Other embodiments of the system may be applied to data other than image or video processing and thus the more generic terms "positive sample" and "negative sample" are used. A positive sample is a sample representative of data that the trained system should classify as positive, e.g. belonging to an object class, and a negative sample is a sample representative of data that the systems should classify as negative, e.g. not belonging to an object class. An exemplary collection of positive samples for face detection is shown in FIG. 3.

Figure 4:
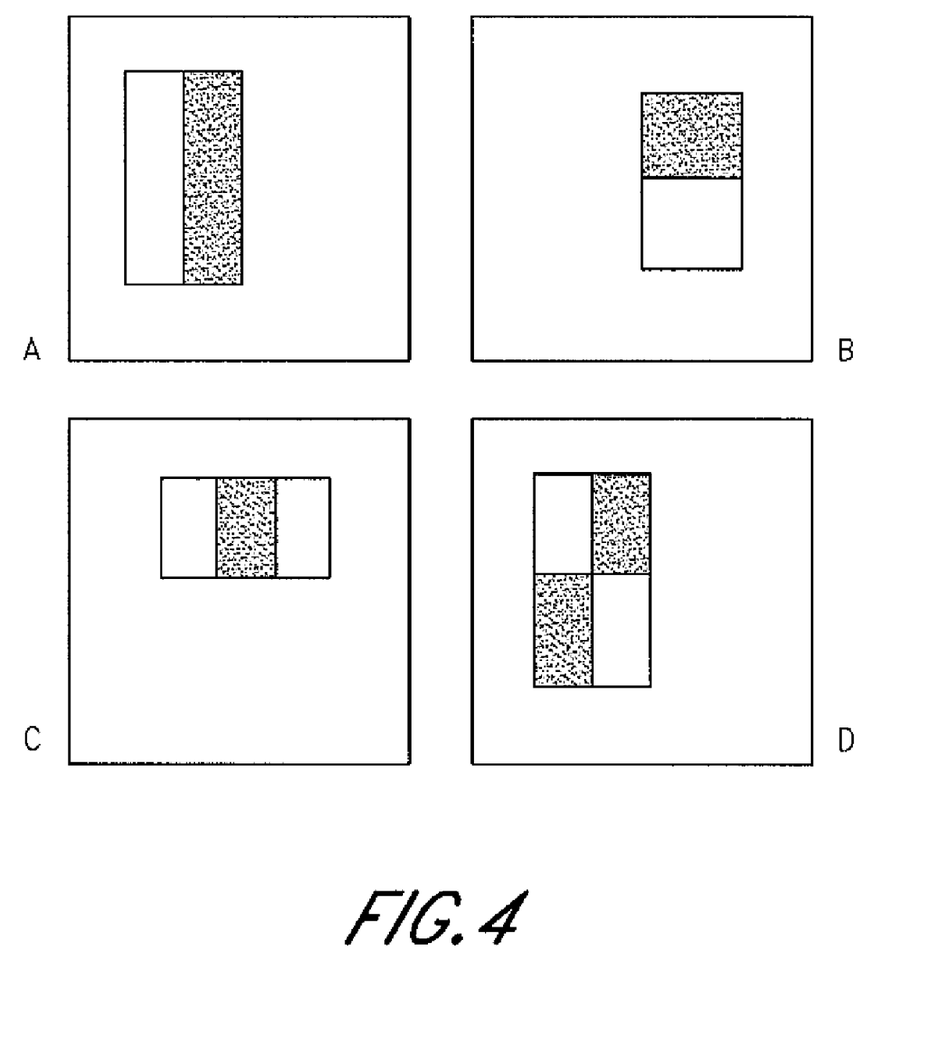
FIG. 4 illustrates a set of Haar-like features.

Next, in block 215, a set of features is obtained. In general, a feature is a function that provides information about a sample. For example, in object detection and classification in an image, a feature may be a function of the pixels of the image which outputs a feature value. In some embodiments, a feature is a linear combination of pixel intensities, achieved by processes such as adding a portion of the image and subtracting another portion. One set of features are Haar-like features, so called because they share an intuitive similarity with the Haar wavelets. Haar-like features are rectangular in nature and may be used to simplify computation. An exemplary set of Haar-like features are shown in FIG. 4. The non-shaded region indicates that that portion of the image is to be summed, and the shaded-region indicates that that portion of the image is to be subtracted. This actively produces a feature value that may be used in computation in addition to or in lieu of the intensity of each pixel. For example, the four features of FIG. 4, applied to a sample image, would provide four feature values. Applying a feature to a sample image involves processing the image data with the process defined by the feature. For example, applying the first Haar-like feature of FIG. 4, denoted A, may involve summing the pixel intensities under the non-shaded rectangle and subtracting from this the pixel intensities under the shaded rectangle to produce a feature value. Feature sets may, of course, be comprised of many more than four features. In some embodiments, hundreds, thousands, or tens of thousands of features may be used as part of a feature set. Although in some, rectangular features may be used, other embodiments may employ features or a circular or arbitrary shape. In other embodiments, other features, including steerable filters, may be employed. The term "steerable filter" is used to describe a class of filters in which a filter of arbitrary orientation is synthesized as a linear combination of basis filters. In contexts other than image processing, the "shape" or "orientation" of a feature is meaningless.

In block 220, a feature value for each feature is defined for each sample of the training set. In some embodiments, not every sample of an obtained training set is used, but a subset of the training set. A new training set is thus formed. A subset may include only one element of the set, at least two elements of the set, at least three elements of the set, a significant portion (e.g. at least 10%, 20%, 30%) of the elements of the set, a majority of the elements of the set, nearly all (e.g., at least 80%, 90%, 95%) of the elements of the set, of all of the elements of the set. Each feature is applied to each sample (both positive and negative) of the training set, and feature values are obtained. As with the training set, in some embodiments, not every feature of the obtained feature set is used, but instead, a subset of the feature set is analyzed.

Next, in block 220, weights are associated with each sample of the training set. Each weight is simply a value to be used in later computation. The weight may correspond to the importance of correctly classifying the sample. In one embodiment, the weights are uniform, e.g., the weight for each positive sample is the same and the weight for each negative sample is the same. Alternatively, differing weights may be assigned depending on characteristics of the data. For example, a signal-to-noise ratio of the training sample may be used to determine a weight for the sample such that the classifier attaches additional importance to the data least likely to be corrupted by noise. In one embodiment, the weight for each positive sample is 1/(2m), where m is the number of positive samples, and the weight for each negative sample is 1/(2l) where l is the number of negative samples. In other embodiments, the weights may be normalized, e.g., such that the sum of the all the weights is one. Normalization may also be performed with respect to the positive and negative weights separately.

Figures 5, 6:
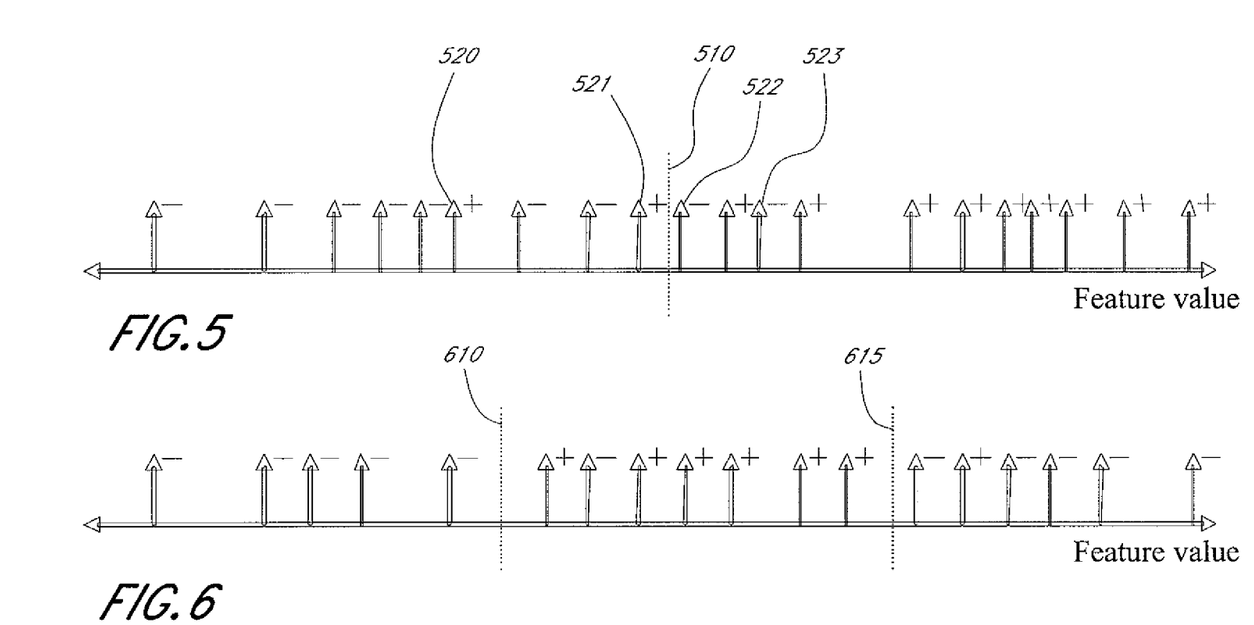
FIG. 5 is a diagram showing exemplary weights and feature values that may result from a feature applied to a training set.
FIG. 6 is a diagram showing exemplary weights and feature values that may result from another feature applied to a training set.

FIG. 5 is a diagram showing exemplary weights and feature values that may result from a feature applied to a training set. Each arrow represents a different sample, with a + indicating a positive sample and a − indicating a negative sample. The height of the arrow may represent the weights assigned to each sample according to one embodiment of the process. The position of the arrow along the horizontal axis represents an exemplary feature value associated with each sample, where higher feature values are located to the right of lower feature values. In this example, a threshold 510 is determined where there are four errors in classification that occur. In particular, two positive samples 520, 521 are improperly assumed to be negative because they have a feature value lower than the threshold, and two negative samples 522, 523 are improperly assumed to be positive because they have a feature value higher than the threshold. If the same feature is applied to an unknown sample, it would be assumed that the feature value would be above the threshold if the sample belonged to the object class and that the feature value would be below the threshold if the sample did not belong to the object class. This assumption would not always be correct, however, if, for example, like the incorrectly classified training samples, a sample which belongs to the object class has a feature value lower than the threshold, or a sample which does not belong to the object class has a feature values higher than the threshold. This motivates the combination of many features to form a strong classifier.

A second example is shown in FIG. 6, which is a diagram showing exemplary weights and feature values that may result from another feature applied to a training set. In this case, two thresholds 610, 615 are determined which provide information beneficial to classifying objects using a similar feature. If the same feature is applied to an unknown sample, it would be assumed that the feature value would be between the two thresholds if the sample belonged to the object class and that the feature value would be outside of the two thresholds if the sample did not belong to the object class.

One method of determining the number of thresholds and their placement is discussed below. For each feature, in block 230, first and second threshold values are determined. In one embodiment, the first threshold value is the value at which a first metric is minimized, where the first metric may be written as:

$$M_1 = S^+ + (T^- - S^-)$$

where $M_1$ is the first metric, $S^+$ is the sum of the weights associated with the positive samples having a feature value greater than the first threshold value, $T^-$ is the sum of the weights associated with all the negative samples, and $S^-$ is the sum of the weights associated with the negative samples having a feature value greater than the first threshold value. In one embodiment, the second threshold value is the value at which a second metric is minimized, where the second metric may be written as;

$$M_2 = S^- + (T^+ - S^+)$$

where $M_2$ is the first metric, $S^-$ is the sum of the weights associated with the negative samples having a feature value greater than the first threshold value, $T^+$ is the sum of the weights associated with all the positive samples, and $S^+$ is the sum of the weights associated with the positive samples having a feature value greater than the first threshold value.

Thus, in one embodiment, the first threshold value may minimize the weighted error of classifying all the samples greater than the threshold as positive and all the samples less than the threshold as negative, wherein the second threshold value may minimize the weighted error of classifying all the samples greater than the threshold value as negative and all the samples less than the threshold as positive.

For some features, such as the feature represented in FIG. 5, where positive samples have a high feature value and negative samples have a low feature value, only one of these thresholds is of much use in classification (e.g., the second threshold). However, other features, such as the feature represented in FIG. 6, result in both high and low feature values for negative samples and medium feature values for positive samples. By using both thresholds in this case, training the system may be simplified. A method of determining the number of thresholds that would be beneficial is described below.

In block 235 of FIG. 2, again for each feature, a comparative value is determined. In some embodiments, only the features belonging to a subset of the features have a comparative value determined. Some embodiments, for instance, may reduce the feature set if the first and second metric is too high, indicating that the feature is a poor classifier. In one embodiment, the comparative value is the lesser of the sum of the weights associated with all the negative samples (T⁻) and the sum of the weights associated with all the positive samples (T⁺). In other embodiments, a different comparative value can be used, such as the average of T⁻ and T⁺. Using the comparative value, in block 240, a number of thresholds is determined. Again, this stage is performed independently for each feature for which it is performed. In one embodiment, if both the first and second metric are less than the comparative value, the number of thresholds is two and both thresholds are used in the following stages. In one embodiment, if only the first or second metric is less than the comparative value, the number of thresholds is one and only the threshold corresponding to the lesser metric is used in the following stages. In one embodiment, if neither the first nor the second metric are less than the comparative value, the feature may be not used in later stages.

In block 245, an error value is determined for each feature for which it has been determined to use thresholds. The error value represents the accuracy of the classifier in properly assessing whether or not samples belong to an object class. The thresholds are used to determine an error value by classifying differently those samples with feature values on opposite sides of a threshold. For example, when one threshold is used, an error may be determined by assuming all the samples with a feature value greater than the threshold are positive samples and all the samples with a feature value less than the threshold are negative samples. This assumption is compared against the known positivity or negativity of the samples to determine an error value. The error value may be determined by using the weights associated with the samples. In another example, with two thresholds, all the samples with feature values between the two thresholds may be assumed to be negative and those outside the two thresholds assumed to be positive. Again, an error value can be determined by comparing the assumption against the known positivity or negativity of the samples.

When the preceding stages have been performed for a number of features, the process moves to block 250, where the feature having the lowest error value is determined. Each feature may, for example, be associated with a feature index. In block 250, the feature index corresponding to the feature having the lower error value may be stored in a memory for later use. In other embodiments, the feature itself may be stored for later use. At this point in the processing, the feature and associated threshold(s) most likely to properly classify a known sample have been determined.

In block 255 of FIG. 2, the weights are updated using the feature with the lowest error value. In one embodiment, the weights are increased for incorrectly classified samples. In one embodiment, the weights are updated according to the following formula:

$$w_{t+1,i} = w_{t,i} \beta_t^{1-e_i},$$

wherein $w_{t+1,i}$ is the updated weight for the ith sample, i.e. the weight for the ith sample at iteration t+1, $w_{t,i}$ is the original weight for the ith sample, i.e. the weight for the ith sample at iteration t, $$\beta_t = \frac{\varepsilon_t}{1-\varepsilon_t},$$

$\varepsilon_t$ is error value of the feature, and $e_i$ is 0 if the ith sample is classified correctly and 1 if the ith sample is classified incorrectly. Thus, some embodiments use the error value of the feature with the lowest error value to update the weights.

Figure 7:
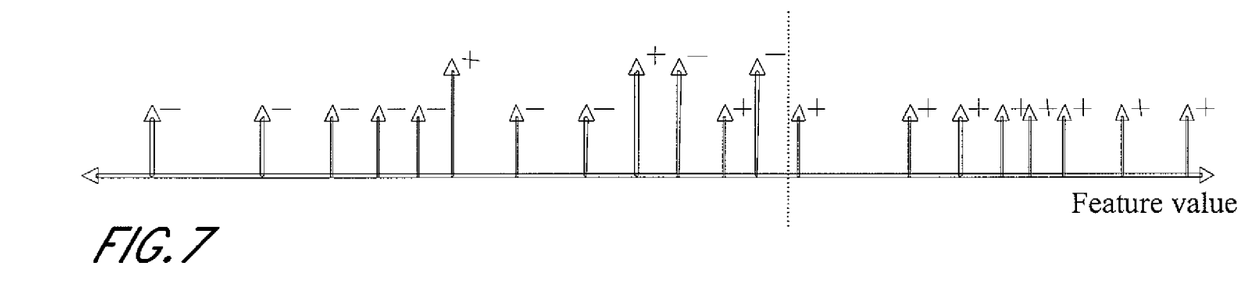
FIG. 7 is a diagram showing exemplary weights that may result after one iteration of an adaptive boosting method applied to the feature of FIG. 5.

FIG. 7 is a diagram showing exemplary weights that may result after one iteration of an adaptive boosting method applied to the feature of FIG. 5. The samples which were incorrectly identified, in this example, have a higher weight than in the previous iteration. Because of the updated weights, the threshold values may change from iteration to iteration.

A determination is made in block 260 of FIG. 2 as to whether the final iteration has been performed. If there are more iterations to be performed, the process returns to block 230 to predetermine the first and second threshold values and perform the following stages. The number of iterations may be a fixed number, T, e.g. 2, 3, 4, 10, 20, etc. The number of iterations may also be determined dynamically be examining, for example, the error value, or the first and second metric. If the final iteration has been performed, the process moves to block 265 where a strong classifier is defined based on the feature having the lowest error value at each iteration. As mentioned, above, this feature was determined in block 250. For a number of iterations, a number of features may be determined, and each of them used to define a strong classifier. Defining a strong classifier, in general, involves combining features. As mentioned, in one embodiment, a classifier receives, as an input, a sample, and outputs an indication of whether the sample belongs to an object class or does not belong to an object class. In one embodiment, the strong classifier may be defined by the following equation:

$$C(x) = \begin{cases} 1, & \text{if } \sum_{t=1}^{T} \alpha_t h_t(x) \geq \frac{1}{2}\sum_{t=1}^{T} \alpha_t, \\ 0, & \text{otherwise} \end{cases}$$

wherein x represents a sample to be classified, C(x) is the strong classifier acting upon the sample, $$\alpha_t = \log\frac{1}{\beta_t},$$

and $h_t(x)$ is the feature value of the sample determined by the feature having the lowest error at iteration t. The term "log" above may represent the natural logarithm, a base-10 logarithm, or a logarithm to any other base. In this embodiment, the sample x is processed by the equation, and a 1 indicates that the sample belongs to the object class and a 0 indicates that the sample does not belong to the object class.

The defined strong classifier may then be stored, transmitted, displayed, or in any other way, output from the system. The strong classifier may also be transferred to another functional part of the system for further processing. For example, the processing may include using the strong classifier to perform object detection. The strong classifier may be stored in, among other places, the cache 108 or main memory 110. They may be transmitted via, for example, the network 112.

Although the above description refers only to two thresholds, any number of thresholds may be used without departing from the scope of this disclosure. For example, four thresholds may be used to classify an object from a feature where the feature values of negative samples are spread uniformly and the feature values of positive samples are centered around two separate values. If the same feature is applied to an unknown sample, it would be assumed that the feature value would be either between the first and second thresholds or the third and fourth thresholds if the sample belonged to the object class and that the feature value would be outside of these regions if the sample did not belong to the object class.

Face Detection and Classification

One application of a strong classifier trained using the method described above is in face detection. For example, a video camera connected to a computer may be able to track a user as he or she moves their face around the field of view. Other uses of face detection may aid in facial recognition programs. One goal of face detection is to take an input image (such as a frame of video) and characterize a portion of the image as being a human face.

Figure 8:
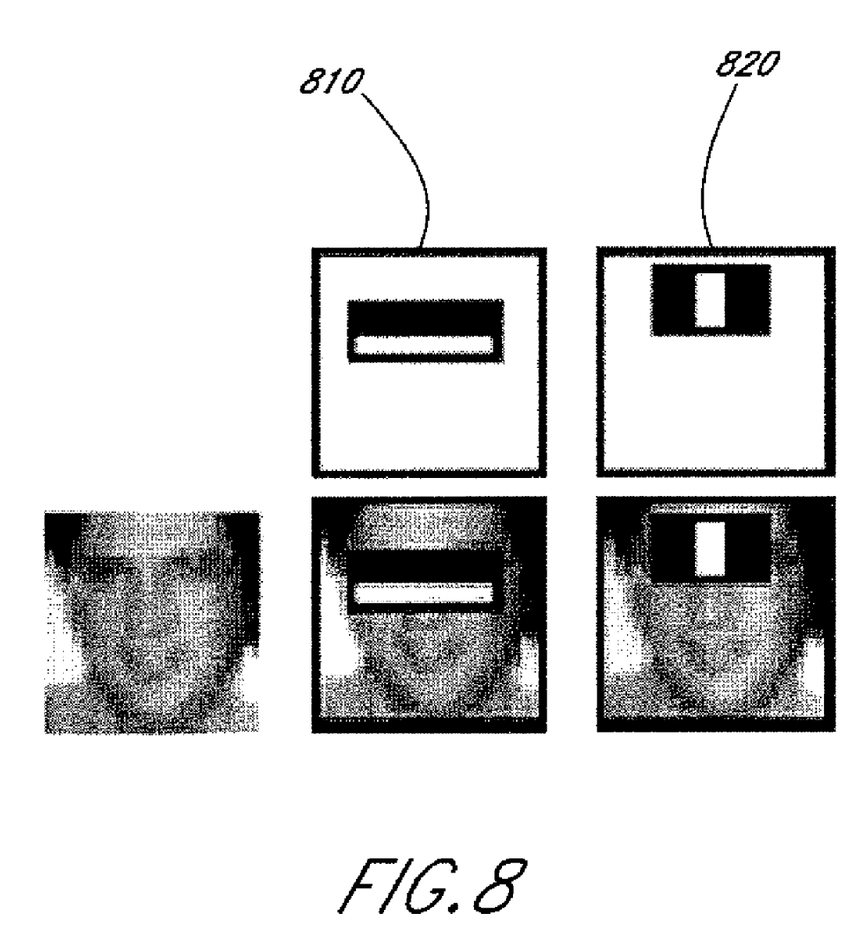
FIG. 8 is a diagram showing exemplary first and second features selected by one embodiment of the system.

A set of positive training samples is shown in FIG. 3. FIG. 8 is a diagram showing exemplary first and second features selected by one embodiment of the system. The first feature 810 may be selected, for example by block 250 of method 200, because, in general, the eyes are darker than the area beneath the eyes. The second feature 820 may be selected because, in general, the bridge of the noise is lighter than the eyes.

Figure 9:
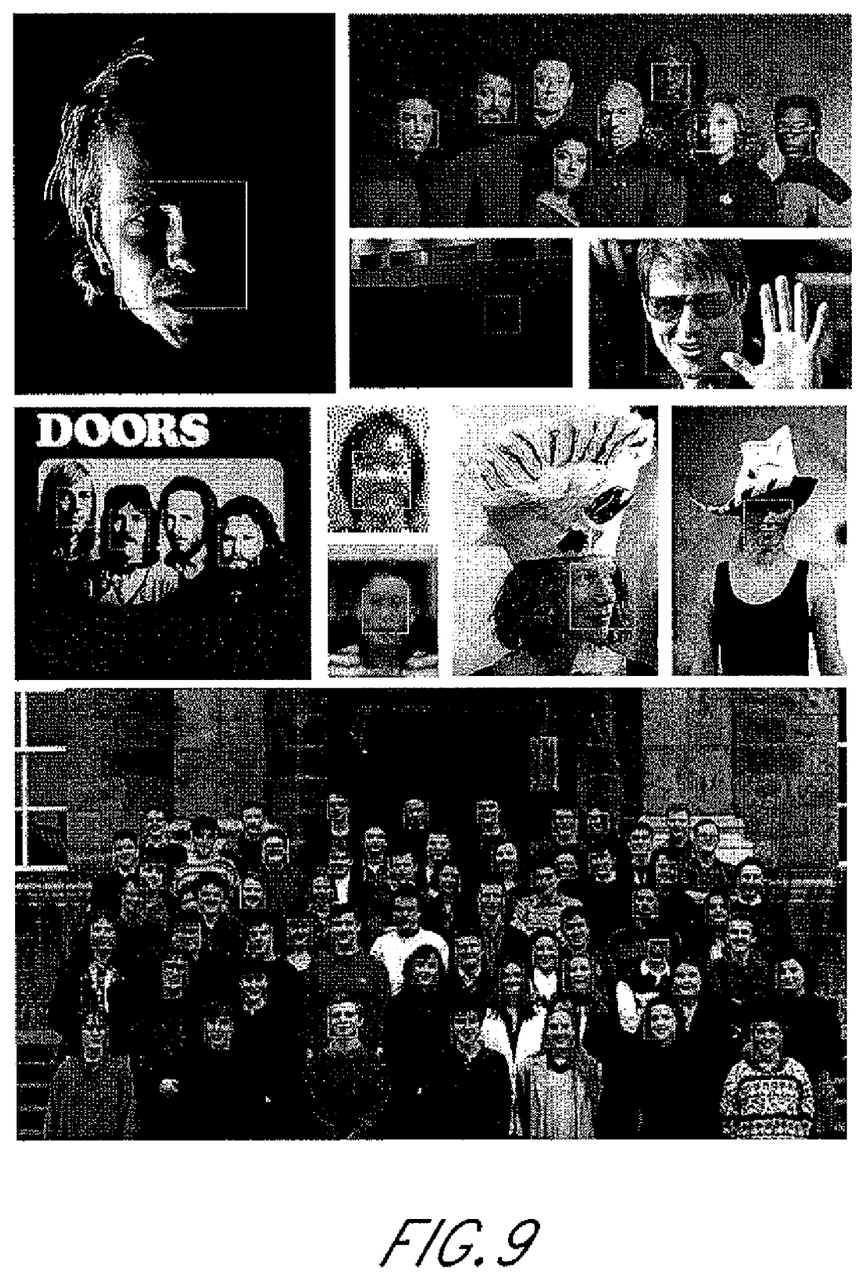
FIG. 9 is an exemplary collection of outputs of one embodiment of a face detection system.

After a strong classifier has been trained, for example, by using the method described above, portions of an input image at a number of positions and a number of scales may be input into the classifier to attempt to classify the portion as either being a face or not a face. FIG. 9 is an exemplary collection of outputs of one embodiment of a face detection system. In this example, the image has a box superimposed over the image whenever the strong classifier identified that portion as being a face.

CONCLUSION

In general, a classifier, such as a strong classifier trained by the above method, is used to classify a data sample as either belonging to an object class or not belonging to an object class. Thus, in some embodiments, classification using the strong classifier is performed to output an indicator that a piece of data is an object or not an object. The indicator may be used as part of object detection in an image, for example.

Faces are not the only objects in an image that may be detected using the above-described methods. For example, if the object class includes human hands, the paths or trajectories formed by video analysis of hand movements may be used as part of a human-machine interface. If the object class includes vehicles (cars, trucks, SUVs, motorcycles, etc.), the process may be employed to automate or facilitate traffic analysis. An automated craps table may be created by selected and training dice as the object class, tracking the thrown dice with a camera, and analyzing the resulting number when the dice have settled to rest.

Indeed, the above-described methods are not limited only to image analysis. The method may be applied, for example, to train a strong classifier to work on audio data. An oceanic recording may be analyzed by the strong classifier to determine whale sounds and facilitate population analysis and/or promote conservation efforts. Still other data sets may benefit from a strong classifier trained in the disclosed methods.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of defining a strong classifier, the method comprising:
    receiving a training set of positive and negative samples by an input device;
    receiving a set of features;
    associating, for each of a first subset of the set of features, a corresponding feature value with each of a first subset of the training set;
    associating a corresponding weight with each of a second subset of the training set;
    iteratively
        i) determining, for each of a second subset of the set of features, a first threshold value at which a first metric is minimized;
        ii) determining, for each of a third subset of the set of features, a second threshold value at which a second metric is minimized;
        iii) determining, for each of a fourth subset of the set of features, a number of thresholds;
        iv) determining, for each of a fifth subset of the set of features, an error value based on the determined number of thresholds;
        v) determining the feature having the lowest associated error value; and
        vi) updating the weights;
    defining a strong classifier based on the features having the lowest error value at a plurality of iterations far storing on a cache, a main memory, or a combination thereof; and
    classifying a sample as either belonging to an object class or not belonging to an object class based on the strong classifier.

2. The method of claim 1, wherein each feature is a function of pixel values.

3. The method of claim 1, wherein at least one of the first, second, third, fourth, and fifth subset of the set of features comprises each of the set of features.

4. The method of claim 1, wherein at least one of the first or second subset of the training set comprises each of the positive and negative samples.

5. The method of claim 1, wherein at least two of the first, second, third, fourth, and fifth subset of the set of features are the same subset.

6. The method of claim 1, wherein at least one of the second, third, fourth, and fifth subset of the set of features in a first iteration are different than the second, third, fourth, and fifth subset of the set of features, respectively, in a subsequent iteration.

7. The method of claim 1, wherein the first metric is the sum of the weights associated with the negative samples plus the sum of the weights associated with the positive samples having a feature value greater than the first threshold value minus the sum of the weights associated with the negative samples having a feature value greater than the first threshold value.

8. The method of claim 1, wherein the second metric is the sum of the weights associated with the positive samples plus the sum of the weights associated with the negative samples having a feature value greater than the second threshold value minus the sum of the weights associated with the positive samples having a feature value greater than the second threshold value.

9. The method of claim 1, wherein determining a number of thresholds comprises comparing at least the first and second threshold values to a comparative value.

10. The method of claim 9, wherein the comparative value is the lesser of the sum of the weights associated with all the negative samples and the sum of the weights associated with all the positive samples.

11. The method of claim 1, wherein updating the weights comprises updating the weights based on the lowest error value.

12. The method of claim 11, wherein the weights are updated according to the formula $W_{t+1,i} = W_{t,i} \beta_t^{1-e_i}$, wherein $W_{t+1,i}$ is the updated weight for the ith sample, $W_{t,i}$ is the original weight for the ith sample, $$\beta_t = \frac{\varepsilon_t}{1-\varepsilon_t},$$

$\epsilon_t$ is error value of the feature, and $\epsilon_t$ is 0 if the ith sample is classified correctly and 1 if the ith sample is classified incorrectly.

13. The method of claim 1, wherein the strong classifier is defined by the formula $$C(x) = \begin{cases} 1, & \text{if } \sum_{t=1}^{T} \alpha_t h_t(x) \geq \frac{1}{2} \sum_{t=1}^{T} \alpha_t, \\ 0, & \text{otherwise} \end{cases}$$

wherein x represents a sample to be classified, C(x) is the strong classifier acting upon the sample, $$\alpha_t = \log \frac{1}{\beta_t},$$

and $h_t(x)$ is the feature value of the sample determined by the feature having the lowest error at iteration t.

14. A system for defining a strong classifier, the system comprising:
an input device configured to receive a training set of positive and negative samples;
a feature module configured to receive a set of features;
a feature value module configured to associate, for each of a first subset of the set of features, a corresponding feature value with each of a first subset of the training set;
a weight module configured to associate a corresponding weight with each of a second subset of the training set;
a computation module configured to iteratively
  i) determine, for each of a second subset of the set of features, a first threshold value at which a first metric is minimized;
  ii) determine, for each of a third subset of the set of features, a second threshold value at which a second metric is minimized;
  iii) determine, for each of a fourth subset of the set of features, a number of thresholds;
  iv) determine, for each of a fifth subset of the set of features, an error value based on the determined number of thresholds;
  v) determine the feature having the lowest associated error value; and
  vi) update the weights;
a definition module configured to define a strong classifier based on the features having the lowest error value at a plurality of iterations for storing on a cache, a main memory, or a combination thereof; and
a classification module configured to classify a sample as either belonging to an object class or not belonging to an object class based on the strong classifier.

15. The system of claim 14, wherein the input is a memory access module configured to receive a training set from a memory.

16. The system of claim 14, further comprising an output module configured to output an indication that the sample belongs to an object class or does not belong to an object class.

17. The system of claim 14, further comprising a storage module configured to store the defined strong classifier in a memory.

18. The system of claim 14, further comprising a storage module configured to store an indication that the sample belongs to an object class or does not belong to an object class in a memory.

19. A program storage device storing instructions that when executed perform a method of defining a strong classifier, the method comprising:
receiving a training set of positive and negative samples;
receiving a set of features;
associating, for each of a first subset of the set of features, a corresponding feature value with each of a first subset of the training set;
associating a corresponding weight with each of a second subset of the training set;
iteratively
  i) determining, for each of a second subset of the set of features, a first threshold value at which a first metric is minimized;
  ii) determining, for each of a third subset of the set of features, a second threshold value at which a second metric is minimized;
  iii) determining, for each of a forth subset of the set of features, a number of thresholds;
  iv) determining, for each of a fifth subset of the set of features, an error value based on the determined number of thresholds;
  v) determining the feature having the lowest associated error value; and
  vi) updating the weights;
defining a strong classifier based on the features having the lowest error value at a plurality of iterations; and
classifying a sample as either belonging to an object class or not belonging to an object class based on the strong classifier.

* * * * *